United States Patent [19]
Pear, Jr.

[11] 3,786,181
[45] Jan. 15, 1974

[54] OPTICAL LINE SCANNER AND FACSIMILE SYSTEM

[75] Inventor: Charles B. Pear, Jr., Greenlawn, N.Y.

[73] Assignee: Potter Instrument Company, Inc., Plainview, N.Y.

[22] Filed: Sept. 7, 1971

[21] Appl. No.: 178,211

[52] U.S. Cl. .......... 178/6.8, 178/DIG. 2, 178/6.6 R, 178/7.2

[51] Int. Cl. .......... H04n 3/00

[58] Field of Search .......... 178/6.8, DIG. 2, 178/DIG. 20, DIG. 23, DIG. 38, 6.6 R, 5, 6, 7.2; 346/101

[56] References Cited

UNITED STATES PATENTS

| | | | |
|---|---|---|---|
| 3,660,594 | 5/1972 | Marsh | 178/DIG. 2 |
| 3,294,903 | 12/1966 | Goldmark et al. | 178/6.8 |
| 2,529,978 | 11/1950 | Thompson | 178/6.6 R |
| 3,409,904 | 11/1968 | Maiershofer | 178/6.6 R |
| 3,290,505 | 12/1966 | Stavis | 178/DIG. 2 |

*Primary Examiner*—Benedict V. Safourek
*Assistant Examiner*—Joseph A. Orsino, Jr.
*Attorney*—Lane, Aitken et al.

[57] ABSTRACT

To scan a long line of printed information, a fiber-optic line-to-rectangle converter is configured at one end to divide a long scan line into a plurality of shorter segments which are arranged at the opposite end to form an array composed of consecutive segments stacked in parallel. Since the array covers an area instead of a line, a video camera tube scanning the array utilizes more of its useable face area thus improving image resolution for the converted line. To operate a helical bar printer having as many hammers as line segments in the converter, the rectangular image is scanned with a series of horizontal sweeps orthogonal to the line segments. With each sweep, the hammers are fired simultaneously in response to video signals indicative of the light level at corresponding positions in each line segment.

9 Claims, 9 Drawing Figures

INVENTOR
CHARLES B. PEAR, JR.

BY Lane, Aitken, Dunner & Ziems
ATTORNEYS

INVENTOR
CHARLES B. PEAR, JR.

BY Lane, Aitken, Dunner & Ziems
ATTORNEYS

INVENTOR
CHARLES B. PEAR, JR.

BY Lane, Aitken, Dunner & Ziems
ATTORNEYS

INVENTOR
CHARLES B. PEAR, JR.

BY Lane, Aitken, Dunner & Ziems
ATTORNEYS

OPTICAL LINE SCANNER AND FACSIMILE SYSTEM

BACKGROUND OF THE INVENTION

The invention relates generally to optical scanners and facsimile systems, and more particularly to improved systems for scanning a long line without mechanical movement, using a relatively low resolution video camera tube to provide a video input to a facsimile printer.

Unlike photographic or xerographic copiers, most facsimile systems first scan the original document in parallel consecutive sweeps with a light level sensor to produce a sequence of electrical signals which drive a dot printer. The dot printer reproduces the original one narrow line at a time.

The mechanical and electrical elements of an improved helical bar facsimile printer are disclosed in the copending application Ser. No. 136,950 for "Facsimile Printing System" by John T. Potter, filed Apr. 23, 1971, assigned to the assignee of this application. Briefly, that printer comprises a continuously rotating helical bar with a plurality of convolutions and a corresponding plurality of hammer blades alined in parallel with the helix axis. Paper and inked ribbon are carried between the bar and hammer blades. Dots are printed by individually impelling or pressing the hammer blades against the bar. As the bar rotates the points where the helical bar and hammers intersect are continuously and repeatedly advanced along a line in each line segment. An entire line is thus composed by printing a plurality of line segments simultaneously.

As shown in the above referenced copending application, one method of scanning for multiple hammer line printers in the prior art was to scan the original with a plurality of light sensitive photocells riding on a linear bar. Each cell was simultaneously moved over a segment of the line corresponding to a given hammer in the printer. A second set of cells was mounted on another bar next to the first so that consecutive sweeps could be made without waiting each time for return of the cells to the sweep start position.

While the photocell system performed satisfactorily and could provide high resolution, its scanning speed was inherently limited by the need for actual mechanical movement. Nonmechanical video tube or television-type raster scanning systems are much faster but scan one line at a time rather than a plurality of line segments simultaneously.

SUMMARY OF THE INVENTION

Accordingly, the general purpose of the invention is to permit the use of the output of a single video camera tube with improved resolution in driving a printer which prints a plurality of line segments simultaneously to compose a facsimile of an original line scanned by the tube.

This and other objects of the invention are achieved by interposing, between the video tube and the original document, a fiber-optic device which converts a given line of information at one end into a series of line segments which are rearranged at the opposite end to form a rectangular array of consecutive line segments stacked in parallel. Instead of scanning each complete line segment in the rectangular array consecutively so as to read the original line in its natural order, the scanning sweeps of the video tube are orthogonal to the length of each segment. The orientation of the rectangle relative to the video tube's horizontal sweep is such that on the first sweep corresponding first positions in each line segment are read out. Similarly, on the second sweep, corresponding second positions in each line are read out.

DESCRIPTION OF THE PREFERRED EMBODIMENT

Figure 1:
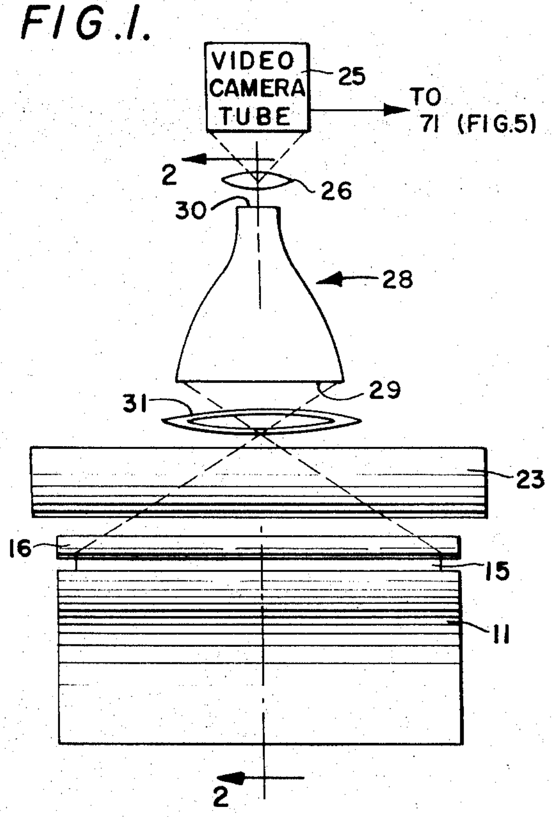
FIG. 1 is a schematic representation of a system for electronically scanning illuminated lines on an advancing page.
Figure 2:
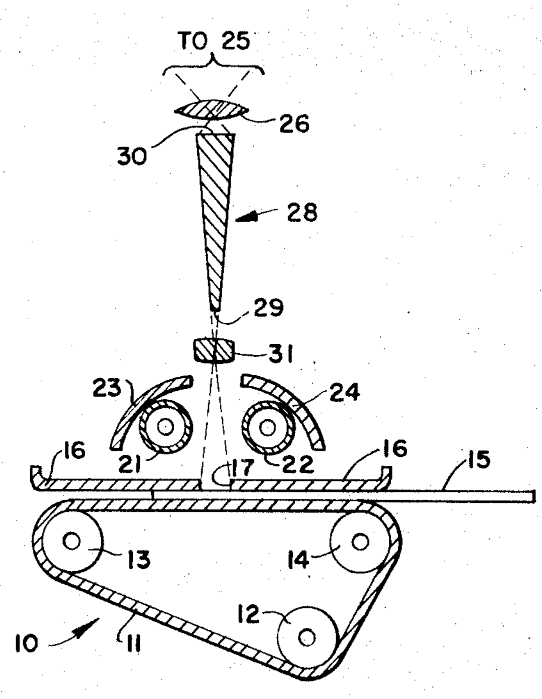
FIG. 2 is a cross sectional view of the scanning system taken along lines 2—2 of FIG. 1.

Referring to the drawings, the fiber-optic line-to-rectangle converter is used in a line scanning system shown in FIGS. 1 and 2. A transport, shown generally at 10, comprises an endless conveyor belt 11 driven by a step-advance roller 12. Belt 11 is strung over a pair of rollers 13 and 14 to provide a flat copying surface. A page to be read is inserted at the flared end of a flat upper guide 16 parallel to the copy surface. Guide 16 has a narrow slot 17 through which the printed material on page 15 may be viewed, perferably one scan line at a time although more than one scan line may be viewed if desired. The video tube resolution determines the scan width.

A pair of parallel lamps 21 and 22 are arranged above and to either side of slot 17 backed by a corresponding pair of reflector hoods 23 and 24 to illuminate the visible scan line of page 15. A fiber-optic line-to-rectangle converter 28 has a linear end 29 which is optically aligned with slot 17. An image of the scan line is received at end 29 of converter 28 via a lens 31 which reduces the effective length of the scan line. Side portions of lens 31 have been removed since they are unnecessary due to the narrow width of slot 17. If desired, lens 31 may be omitted provided end 29 is sufficiently close to 15.

Figure 3:
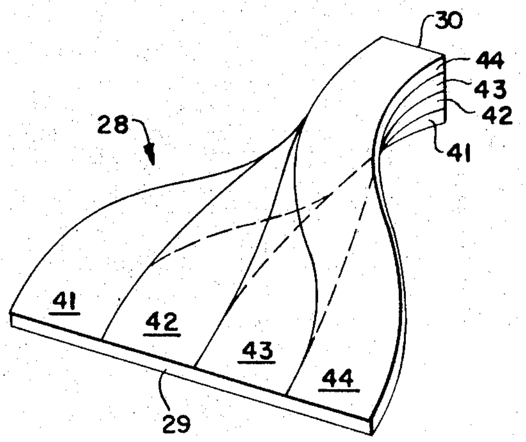
FIG. 3 is a schematic representation illustrating a typical configuration of a four-segment line-to-rectangle fiber-optic converter.
Figure 4:
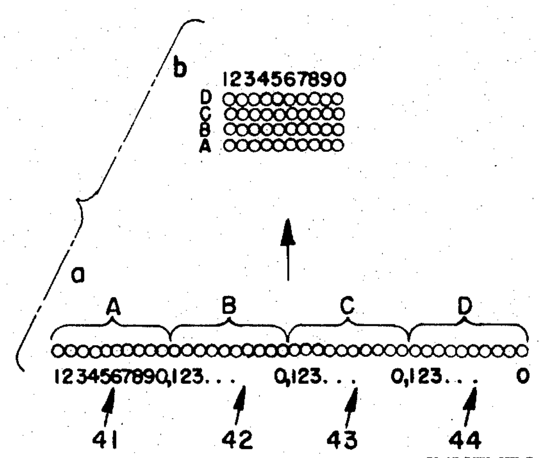
FIG. 4 is a schematic representation of the respective ends of the fiber-optic converter of FIG. 3 showing the order in which the stacked line segments are arranged at the rectangular end.

To illustrate the unusual shape of converter 28, FIGS. 3 and 4 show an example having only four strip-like sections 41, 42, 43 and 44. The sections are composed of a number of parallel optical fibers arranged side by side as in FIG. 4 a and b. Since the conventional fibers are flexible, each section, such as 41, can be bent in any desired manner, and the corresponding ends cemented together in a desired pattern. Sections A, B, C and D, corresponding to sections 41 through 44 respectively, are arranged in consecutive serial or linear order (FIG. 4a) at end 29 to receive light from a straight line through slot 17 (FIG. 2). At the opposite end 30 of converter 28, the segments are rearranged in parallel in a stacked, rectangular array (FIG. 4*b*) with segment A forming the bottom row and segment D forming the top row. When a series of light signals orginating from a line are rearranged to form a rectangle in the manner described, the effect is similar to rewriting a line of print with wider margins, so that the words which originally fit on a single line take up a plurality of lines when retyped. It should be understood that the numbers of sections and fibers shown in FIGS. 3 and 4 were chosen for convenient illustration, and any number of these elements may actually be used in practice.

Referring again to FIG. 1, in the line scanning system shown, rectangular converter end 30 is viewed via enlarging lens 26 by an optically aligned video camera tube 25 which may be of the suitable vidicon type using a raster scan. Lens 26 should be disposed to cause the image of end 30 to cover as much of the usable area of the face of tube 25 as possible, If desired, lens 26 may be omitted and end 30 placed directly in contact with the face of tube 25.

As will be appreciated by those skilled in the art, in the embodiment of the invention disclosed in FIGS. 1 through 7, the scanning rate of the video camera must be compatible with the rate at which the printer operates. Inexpensive, widely available video tubes are designed to operate satisfactorily at sweep rates established in the television industry, namely, 15,000 sweeps per second. If such a video tube is used the data from a scan must be stored in a buffer register for use by a comparatively lower speed printer. However, even if a buffer is employed, an orthogonal scan is still advantageous since output frequency of the data is reduced, thereby simplifying the required circuitry.

Figure 5:
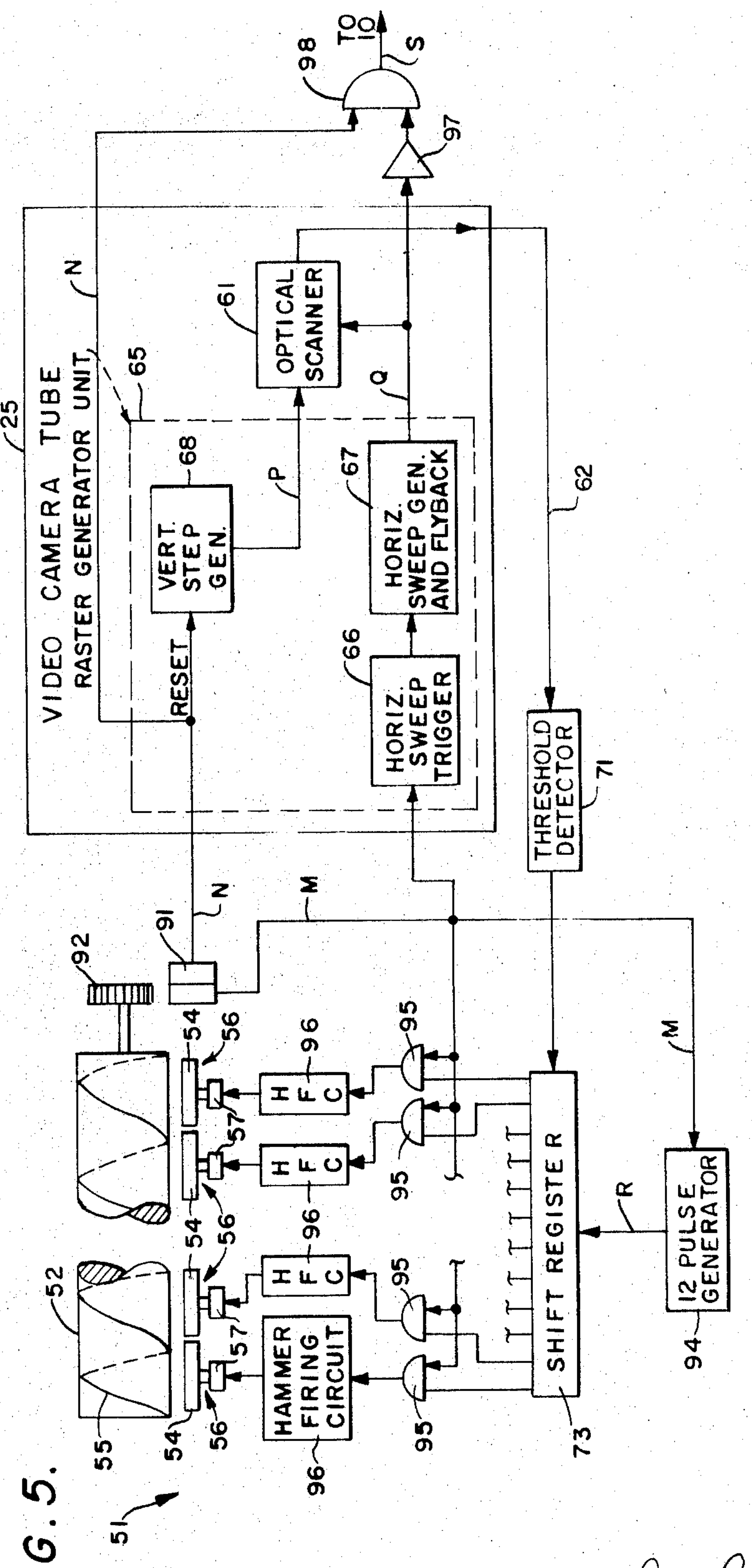
FIG. 5 is a block and schematic diagram illustrating the design of a helical bar printer system utilizing the output of the video tube of FIG. 1 to produce a facsimile copy of the scanned page.

The video signal output 62 of tube 25, representing an electrical analog of the relative brightness of points along the raster scan of rectangular converter end 30, is used to drive a helical bar printer, shown generally at 51, in FIG. 5, to create a facsimile copy of page 15. The mechanical elements of printer 51 are similar to those described in detail in the above-referenced copending application. Printer 51 comprises a drum 52 which is driven continuously at a high speed by a motor (not shown) in close proximity to a row of hammers 56 aligned along a line parallel to the axis of drum 52. The embodiment of the printer herein described has twelve hammers, although only four are shown in FIG. 5, for convenience of illustration. A helical bar 55 on the cylindrical surface of drum 52 extends around the drum in one complete convolution for each hammer 56. Each hammer 56 comprises a blade 54 positioned so that its edge will strike helical bar 55 when the hammer is actuated. Each blade 54 spans only one convolution of the helical bar 55 so that when the hammer is actuated, the blade will strike bar 55 at only one point. Each of the hammers includes a light weight electrical coil 57 fixed to each respective blade 54. Coils 57 are in a constant magnetic field provided by a permanent magnetic field structure (not shown). To actuate each hammer 56, a firing pulse is pulse is applied to coil 57 which drives the associated blade 54 against bar 55.

Paper on which the printing is carried out and an ink or carbon ribbon (not shown) are positioned between blades 54 and drum 52 so that when an actuated hammer blade strikes bar 55, a dot will be printed on the paper at the intersection of the blade and the helical bar. As drum 52 rotates, the intersection of bar 55 and each blade 54 will move repeatedly from left to right across the blade. As the intersection progresses in one pass by a blade 54, the hammer can be actuated repeatedly to print a selected pattern of dots along a line corresponding to the edge of the hammer blade. This line, extended along all of the blade edges, is referred to as the "print line." The print paper is moved through the print line as the printing is carried out so that lines of dot patterns can be printed continuously on the paper. It is important to note that corresponding intersections of blades 54 and respective convolutions of bar 55 occur simultaneously along the length of drum 52. If 12 dots are to be printed by respective blades 54 at the same location on each blade, the blades will all be fired at once.

Referring again to FIG. 4*b*, a natural scanning order for directly reading the "rectangularized" line would be to scan one row at a time. For example, line A would be read first in its entirety and then line B and so forth from the bottom to the top of the rectangle. However, the exact opposite type of scan is used in connection with facsimile printer 51 (FIG. 5).

Figure 6:
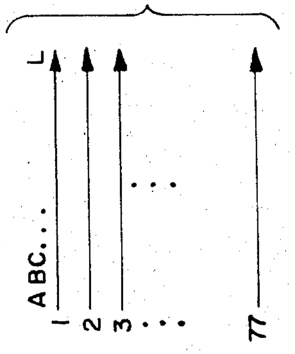
FIG. 6 is a schematic representation of the orientation of the raster scan in the video tube of FIG. 1 relative to the arrangement of line segments as in FIG. 4 when used with the facsimile system of FIG. 5.

Because of the relationship between blades 54 and rotating helical bar 55, the scan of rectangular end 30 of converter 28 must be orthogonal relative to a normal reading-type scan. FIG. 6 represents a rectangular array of fiber sections at end 30 (FIG. 1) having a more typical number of sections and fibers. There are 12 sections, A through L which correspond respectively to the 12 hammers 56 of FIG. 5. Preferably, each section has more fibers per section than corresponding dot printing positions. Typically at linear end 29 of converter 28, there would be a line of 3,600 fibers covering the image of the scan line. When a converter, like that shown in FIG. 3, but having 12 sections, is used to view a scan line, the line is divided into 12 segments which are stacked at the opposite end in a rectangular array similar to that shown in FIG. 4*b*. Because of the simultaneous printing positions for blades 54, the first position corresponding to the first fiber bundle end in each section A through L is read in one sweep from left to right. The next sweep takes place underneath and parallel to the first and senses the light levels at the second position which may correspond to the second fiber bundle in each segment A through L.

Referring again to FIG. 5, video camera tube 25 comprises an optical scanner 61 producing an analog video output 62 indicative of the light levels at the scanned positions of a rectangular array like that of FIG. 4*b*. Scanner 61 is controlled by a raster generator unit 65 comprising a horizontal sweep trigger 66, a horizontal sweep generator and flyback circuit 67 and a vertical step generator 68. Raster generator unit 65 causes the light levels to be sensed in a sequence of parallel sweeps from top to bottom as in FIG. 6.

Since it takes a certain period of time to cover all of the one positions (FIG. 6) for all of the segments, the line segments cannot be scanned simultaneously; however, corresponding first positions do occur simultaneously on printer 51. Therefore, the output of scanner 61 for each sweep must be stored in some manner until that sweep has been completed. Output 62 of scanner 61 is passed to a threshold detector 71 which converts the analog signal on line 62 to a digital or binary signal having a high and a low level which will correspond to fire or not fire signals for hammers 56 and dark and light areas along the scan line. The binary output of detector 71 forms the load input to a shift register 73 having 12 consecutive stages to store the print information.

To sense the angular position of drum 52, and thus the location of the intersections of bar 55 and blades 54, a transducer 91 senses a tone wheel 92 attached to drum 52. As drum 52 rotates, tone wheel 92 will cause transducer 91 to produce output pulses on line M. A pulse is produced on line M each time the intersection of helical bar 55 and blades 54 pass through a dot print position corresponding to one of the fiber positions 1 through 77 of FIG. 6. Dot print positions are defined as positions along the print line at which the printer is designed to be capable of printing a dot. The spacing of a dot print position is such that when dots are printed at two adjacent positions, the dots will be approximately contiguous.

Output line M of transducer 91 is fed to a 12 gate generator unit 94 which initiates a sequence of 12 pulses each time an output pulse occurs on line M. The pulses from gate generator 94 shift the contents of register 73 to the left. The shift pulses also act as a sample gate for the first stage, so that the binary video output is sensed at discrete times. The uninverted parallel output of each of the 12 stages of register 73 is passed to a separate AND gate 95, each of which is enabled by the dot print position pulses on line M. The outputs of AND gates 95 are passed to respective hammer firing circuits 96 for each of the 12 hammers.

For synchronous scanning and facsimile printing, the timing of the raster scan for tube 25 is controlled by transducer 91 responsive to the drum position. Horizontal sweep trigger 66 must be synchronized with the dot print positions for printer 51 and thus receives the dot print position pulses on line M to signal the start of each sweep. On a separate output line N, transducer 91 also produces one output pulse per complete revolution of drum 52. This pulse is used to recycle the vertical step generator 68 and is also passed to an AND gate 98 whose output is passed to transport 10 to advance page 16 one scan line (FIG. 1). The other input to AND gate 98 is the inverted output of sweep generator and flyback circuit 67. Gate 98 thus prevents page 15 from being advanced to the next scan line until the last sweep, for example for position 77 on sections A through L is completed.

Figure 7:
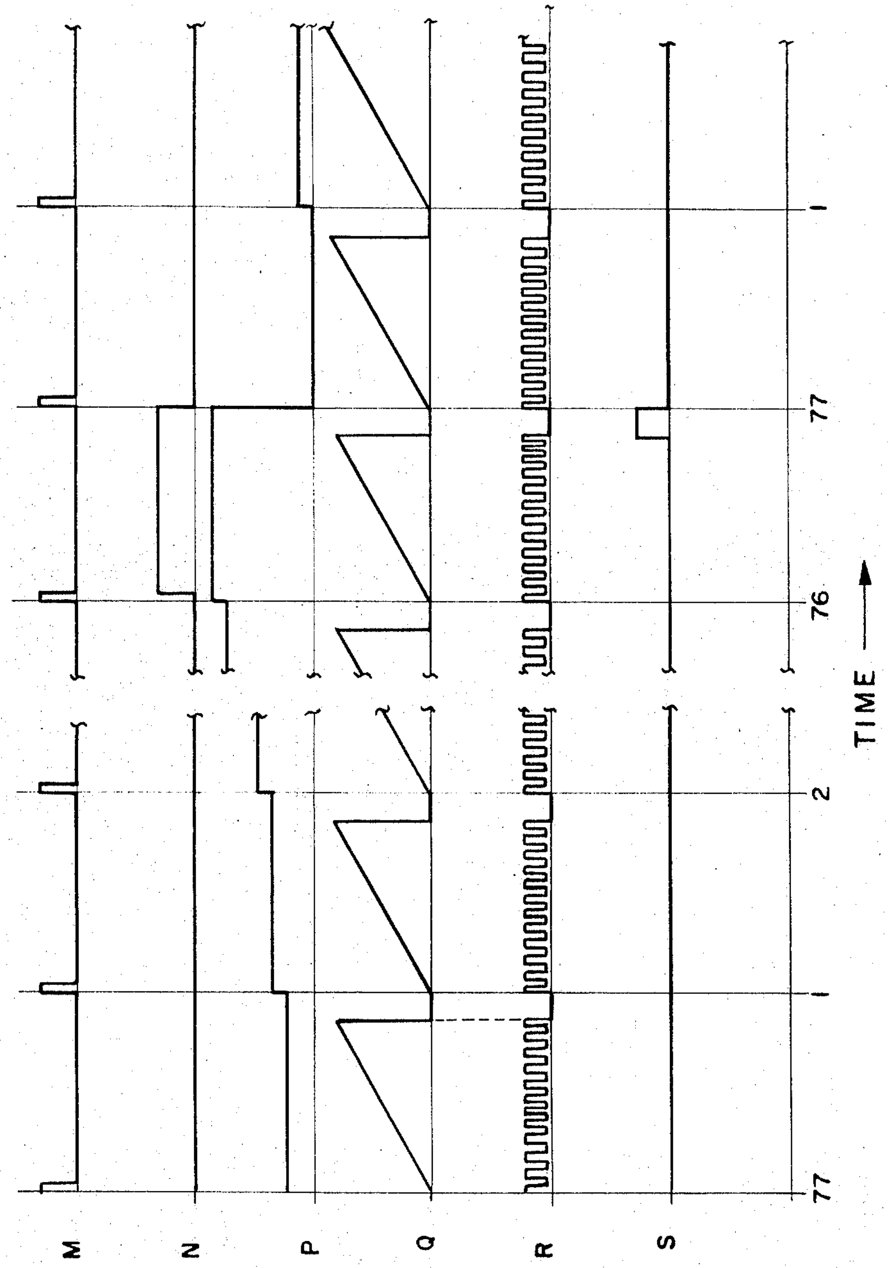
FIG. 7 is a wave form and timing diagram showing a typical sequence of signals produced in the system of FIG. 5.

Referring now to FIG. 7, to further clarify the operation of the system of FIG. 5, the vertical divisions 1 through 77 refer to the dot print positions corresponding to the 77 fibers in each segment A through L. Line M represents the dot print position pulses from transducer 91. Line N represents the pulses from transducer 91 indicating a complete revolution of drum 52. The transducer output on line N is implemented to change state following dot print position 76 and return to the normal state on the occurrence of position 77. As indicated in line P, vertical step generator 68 recycles its output sequence in response to the trailing edge of the pulse in line N. The sweep voltage from generator 67 is indicated in line Q. The sweep just before dot print position 1, gathers all the information relating to the dots to be printed at that position. Therefore the sweep must terminate before the corresponding print position. The repeating twelve pulse sequence in line R represents the shift pulse output of generator 94. This output, passed to register 73, serves to sample the high or low output of detector 71 at positions corresponding to hammers 56. After 12 shifts, register 73 is full of the information from one sweep and on the occurrence of the next dot print position pulse in line M, all gates 95 are enabled simultaneously to sample the register's contents for printing corresponding dots. Reloading of the register is then begun for the next dot print position.

The output of gate 98 which controls the page transport is shown in line S and occurs when the output in line Q is low and there is a simultaneous one revolution output on line N from transducer 91. Since the sweep has been completed for the last dot print position 77, the page may then be moved to the next scan line.

Those skilled in the art of logic design will recognize that other means besides shift register 73 can be used to store information for the 12 hammers until the corresponding dot print position occurs. For example, a set of 12 parallel flip-flops could be gated one at a time by a series of clock pulses so that each bit would be entered initially into the corresponding flip-flop instead of having to be shifted through register 73.

Other types of multiple hammer line printer may be used with the system of FIG. 5 so long as the dot print positions in each line segment occur simultaneously. However, the helical bar printer disclosed here and in more detail in the copending application mentioned above is preferred because of its speed and uncomplicated design.

Figures 8, 9:
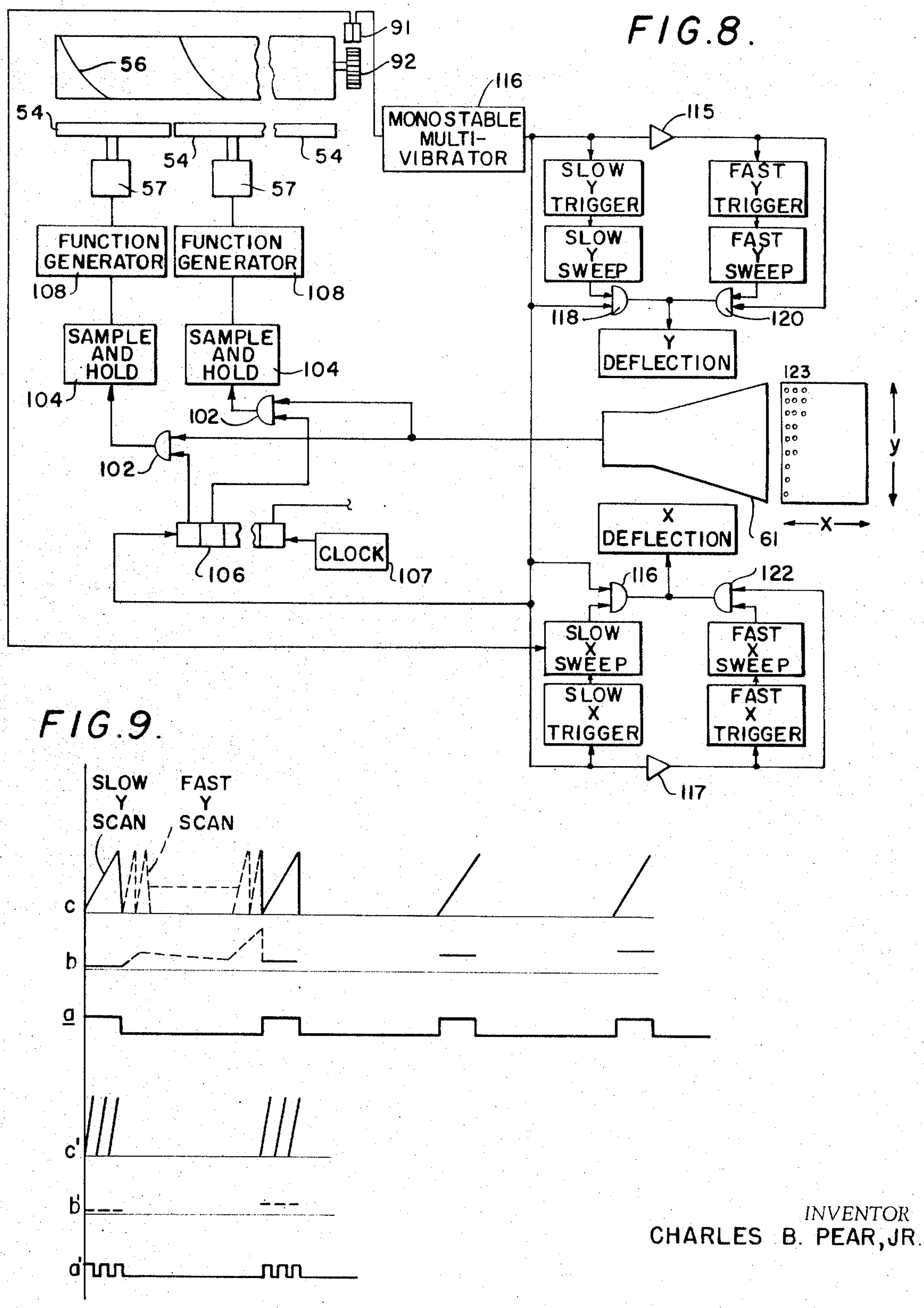
FIG. 8 is a partial schematic diagram of another embodiment of the invention.
FIG. 9 is a wave form and timing diagram for the embodiment of the invention shown in FIG. 8.

FIG. 8 shows an embodiment of the invention which can reproduce a spectrum of gray shades. In this embodiment the hammer blades 54 may be continuously urged against the rotating helix 56 with a force proportional to the darkness of the region instantaneously scanned. In addition, the embodiment of FIG. 8 also teaches how to utilize a video tube with fast scan with a relatively slower helix printer without large data buffers; even where multiple scans are made for each dot position to improve the faithfulness of the reproduced image.

As can be seen in FIG. 8, there is a normally disenabled gate 102, a sample and hold circuit 104, and a function generator 108 associated with each of the hammers 54, respectively. The outputs of a shift register 106, which is stepped by a clock 107 at the "slow" vertical scan rate as more fully described hereinafter, sequentially enable gates 102 as the beams of the vidicon tube scans vertically (y). Thus, as the beam scans the region of the first dot position, the gate 102 associated with the first hammer 54 is enabled; when the beam scans the region of the second vertical position of the fiber optic array, the gate 102 associated with the second hammer is enabled, and so on in sequence, as previously explained.

The gates 102 thusly couple the output of the vidicon tube to the sample and hold circuits 104 outputs of which are proportional to the vidicon tube output at the instant their associated gates 102 are disenabled. These outputs are maintained until the respective gates 102 are again enabled. Since the vidicon output is proportional to the intensity of the light reflected from the scanned surface, the output of each sample and hold circuit will likewise be proportional to this reflectance.

The print hammer pressure required to mark the paper with a certain intensity is not a linear function. The output of each sample and hold circuit 104 is, therefore, respectively coupled to a function generator 108 which generates output signal which is a nonlinear function of its input signal, matching the characteristics of the hammers to vidicon tube output.

In this embodiment the vidicon tube 61 is operated at two sweep rates and may be of a commercially available type which is so designed that it operates satisfactorily only at a high sweep rate relatively to the operating rate of the helix printer. A fast and a slow sweep generator and two sweep triggers are provided for both the horizontal ($x$) sweep and vertical ($y$) sweep. The fast sweep generators sweep the beam of tube 61 at its designed rate and the slow sweep generators sweep the beam at a rate compatible with the rate at which the printer prints.

As previously explained, transducer 91 produces an output pulse each time the drum rotates through an arc sufficient to advance the helical bars one dot position. A monostable multivibrator 116 shapes this output to a narrow pulse which triggers the slow sweep generators and enables gates 116 and 118, coupling the slow $x$ and slow $y$ sweeps to the deflection coils. Amplifiers 115 and 117 invert and couple output of multivibrator 116 to gates 120 and 122 also, disenabling these gates and uncoupling the fast scans from the deflection coils. At the termination of this narrow pulse from monostable multivibrator 116, the fast $x$ and fast $y$ scans are coupled to the deflection coils.

Referring now to FIG. 9 as well as FIG. 8, multivibrator 116 generates a series of output pulses, shown at $a$. The slow vertical ($y$) sweep positions the beam to begin each slow vertical scan from the top of the fiber glass array. The slow $x$ sweep generates a series of deflection voltages $b$ which remain essentially constant for the duration of the slow vertical ($y$) sweep, shown at $c$. The slow horizontal ($x$) sweep voltage increases an incremental amount for each pulse received and positions the beam so that successive vertical sweeps of the fiber optic array correspond to all the 1st, 2nd, 3rd . . . . 77th printing positions for all hammers.

After the termination of each pulse from multivibrator 116, the fast $x$ and $y$ scans are coupled to the deflection coils, causing the beam to scan at its normal rate.

The resolution of the electron beam allows each region of the fiber optic array corresponding to a dot printing position to be scanned vertically several times in order to improve the faithfulness of the reproduced image. The circuitry shown in FIG. 8 can conveniently be used to provide such a reproduction system. For example, three scans can be provided simply by providing three one-shot multivibrators 116 which produce three closely spaced pulses for each output from transducer 91. As shown in FIG. 9, a set of three pulses $a'$, $b'$ and $c'$ cause the beam to make three adjacent vertical sweeps within the width of one dot position. The force with which each hammer pressed against the rotating helical bar would vary if the light intensity varied. Upon receipt of the next pulse from transducer 91 the beam would advance to the next column of dot positions.

Although the present invention has been described with reference to a specific embodiment, it will be appreciated that a variety of changes may be made without departing from the scope of the invention. For example, certain features may be used independently and equivalents may be substituted.

I claim:

1. A facsimile system, comprising optical converter means having one end disposed to view a scan line on an object for transforming an image of said scan line to a composite image covering a rectangular area at the opposite end, said converter means including a plurality of groups of adjacent fiber-optic elements corresponding to respective scan line segments of equal length, the groups having corresponding one ends mounted side by side in a line facing the scan line to cover corresponding segments thereof, the groups having their corresponding opposite ends rearranged so as to be stacked in parallel rows in a consecutive order similar to the original order of said segments, video camera tube means mounted facing said opposite end of said converter means for performing a raster scan of the composite image to produce a video output indicative of the relative darkness of points therein, said tube means being oriented relative to said converter means such that said raster scan is performed orthogonally to the length of said rows so that corresponding single positions in said groups are sensed during a single sweep, and printer means comprising multiple hammer printer means for printing corresponding dots simultaneously in a plurality of consecutive, equal length line segments along a single print line and responsive to said video output for printing along a print line corresponding to said scan line to reproduce said object line by line.

2. The system of claim 1 where said multiple hammer printer means includes a continuously rotating helical bar having a number of convolutions of equal length corresponding to the scan line segments, a corresponding plurality of hammer blades arranged in a line next to said helical bar and parallel to the axis thereof, said blades being as long as each corresponding convolution, the intersections of said helical bar and said hammer blades thus moving simultaneously through a plurality of predetermined print positions, and a plurality of circuits associated respectively with said hammer blades for selectively urging individual ones of said hammer blades against said helical bar.

3. The system of claim 2 further comprising processing means operatively inserted between said hammer firing circuits and the video output of said tube means and responsive to the rotation of said helical bar for sending fire and not fire signals to said hammer firing circuits on the occurrence of dot print positions corresponding to portions of said video signal.

4. The system of claim 3 wherein said processing means includes a plurality of storage elements corresponding respectively to said hammer blades responsive to said video signal for storing, during each sweep, said fire and not fire signals for a single dot print position for each hammer blade, and gate means operatively connected between the output of each storage element and the corresponding hammer firing circuit responsive to the rotation of said helical bar for enabling the passage of said fire and not fire signals on the occurrence of a dot print position.

5. The system of claim 4 wherein said storage elements are provided by a shift register having a corresponding number of stages, said processing means further including a shift pulse generator providing a number of shift pulses to said register equal to the number of hammer blades on the occurrence of a dot print position, the first stage of said shift register being connected to receive said video signal for serial entry into said register.

6. The system of claim 5 further comprising means connected to said tube means for synchronizing said raster scan with the rotation of said helical bar so that each sweep is completed in the interval between the occurrences of a corresponding dot print position and the preceding dot print position.

7. The system of claim 6 wherein said synchronizing means includes a horizontal sweep and flyback circuit, a horizontal sweep trigger circuit responsive to the rotation of said helical bar for providing a trigger pulse to said sweep and fly-back circuit corresponding to each dot print position, and vertical step generator means responsive to the rotation of said helical bar for recycling itself with every complete revolution of the bar.

8. The system of claim 7 further comprising a first enlarging lens disposed in front of said one end of said converter means.

9. The system of claim 8 further comprising a second enlarging lens interposed between said other end of said converter means and said tube means.

* * * * *